US008519833B2

(12) United States Patent
Emmanuel et al.

(10) Patent No.: US 8,519,833 B2
(45) Date of Patent: Aug. 27, 2013

(54) METHOD FOR COUPLING/UNCOUPLING BETWEEN A TRANSMITTER AND A RECEIVER

(75) Inventors: Michel Emmanuel, Chazelles (FR); Francis Chauvet, Moutiers (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 434 days.

(21) Appl. No.: 12/863,855

(22) PCT Filed: Feb. 3, 2009

(86) PCT No.: PCT/EP2009/051203
§ 371 (c)(1), (2), (4) Date: Jul. 21, 2010

(87) PCT Pub. No.: WO2009/098202
PCT Pub. Date: Aug. 13, 2009

(65) Prior Publication Data

US 2010/0297951 A1 Nov. 25, 2010

(30) Foreign Application Priority Data

Feb. 7, 2008 (FR) ..................................... 08 50783

(51) Int. Cl.
*G05B 11/01* (2006.01)

(52) U.S. Cl.
USPC .................... 340/12.5; 340/12.51; 340/13.25; 340/13.26; 340/539.11; 455/41.2; 455/70

(58) Field of Classification Search
USPC ............ 340/12.5, 12.51, 12.52, 12.53, 12.54, 340/13.1, 13.2, 13.21, 13.22, 13.24; 455/70; 370/254
See application file for complete search history.

(56) References Cited

U.S. PATENT DOCUMENTS 4,529,980 A * 7/1985 Liotine et al. ................ 340/9.16
4,897,644 A * 1/1990 Hirano .......................... 340/5.62
5,021,790 A * 6/1991 Ohta et al. ...................... 342/44
5,148,159 A * 9/1992 Clark et al. .................. 340/5.25
5,291,193 A * 3/1994 Isobe et al. .................... 340/9.16
5,473,318 A * 12/1995 Martel ......................... 340/5.23
5,854,593 A * 12/1998 Dykema et al. ............ 340/12.23
5,957,695 A * 9/1999 Redford et al. ........... 434/307 R
5,995,013 A * 11/1999 Yoshizawa et al. .......... 340/5.23
6,101,428 A * 8/2000 Snyder .............................. 701/2
6,181,255 B1 * 1/2001 Crimmins et al. ......... 340/12.28
7,224,980 B2 * 5/2007 Hara ......................... 455/456.1
7,375,612 B2 * 5/2008 Murray et al. ............... 340/5.54

(Continued)

FOREIGN PATENT DOCUMENTS

EP 1 583 321 10/2005
FR 2 855 643 12/2004
WO 98 02860 1/1998

*Primary Examiner* — Benjamin C Lee
*Assistant Examiner* — Quang D Pham
(74) *Attorney, Agent, or Firm* — Oblon, Spivak, McClelland, Maier & Neustadt, L.L.P.

(57) ABSTRACT

The invention relates to a method for coupling/uncoupling between a transmitter (1) and a receiver (2) capable of communicating with one another via a wireless link, characterized in that it comprises the following steps:

Figure 1:
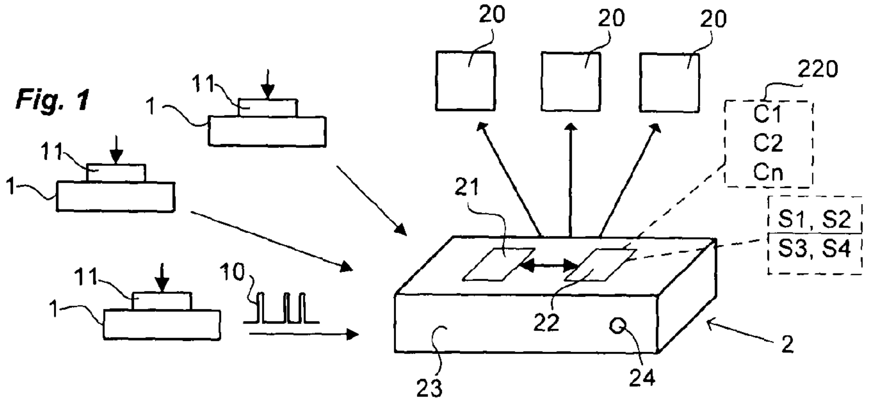

transmission of a first signal by the transmitter (1),
transmission of a second signal by said transmitter (1),
amplitude processing by the receiver (2) of the first signal (30, 32) and of the second signal (31, 33) received and storage or deletion by the receiver of an identification code (C1, C2, Cn) of the transmitter (1) according to the processing carried out.

24 Claims, 2 Drawing Sheets

(56) References Cited

U.S. PATENT DOCUMENTS

| | | | | |
|---|---|---|---|---|
| 7,616,113 | B2 * | 11/2009 | Ayachitula et al. | 340/539.13 |
| 2003/0023881 | A1 * | 1/2003 | Fitzgibbon et al. | 713/202 |
| 2004/0137878 | A1 * | 7/2004 | Oyama | 455/411 |
| 2004/0239482 | A1 | 12/2004 | Fitzgibbon | |
| 2005/0083224 | A1 * | 4/2005 | Autret | 341/176 |
| 2005/0088275 | A1 * | 4/2005 | Valoteau et al. | 340/3.1 |
| 2005/0107896 | A1 * | 5/2005 | Kucera et al. | 700/65 |
| 2005/0221895 | A1 | 10/2005 | Lum et al. | |
| 2006/0034348 | A1 * | 2/2006 | Schaefer et al. | 375/130 |
| 2006/0049914 | A1 * | 3/2006 | Fitzgibbon | 340/5.23 |
| 2006/0153383 | A1 * | 7/2006 | Bejean | 380/270 |
| 2006/0176148 | A1 * | 8/2006 | Sommer | 340/5.64 |
| 2006/0226949 | A1 * | 10/2006 | Reene | 340/5.25 |
| 2007/0117582 | A1 * | 5/2007 | Ohkubo et al. | 455/522 |
| 2007/0120641 | A1 * | 5/2007 | Sommer et al. | 340/5.22 |
| 2008/0084917 | A1 * | 4/2008 | Sung et al. | 375/130 |
| 2010/0081392 | A1 * | 4/2010 | Rousseau | 455/67.14 |
| 2011/0223862 | A1 * | 9/2011 | Satoh et al. | 455/41.2 |
| 2012/0099619 | A1 * | 4/2012 | Sung et al. | 375/130 |

* cited by examiner

METHOD FOR COUPLING/UNCOUPLING BETWEEN A TRANSMITTER AND A RECEIVER

The present invention relates to a method for coupling/uncoupling between a transmitter and a receiver communicating by wireless link. The invention also relates to a receiver that can be employed in the inventive method.

For some applications, such as, for example, the control of lights, it is increasingly commonplace to use wireless technology. Lights are controlled by wireless link using a transmitter communicating with a receiver provided with an output for sending the command to light a lamp. In order to communicate, the transmitter must be known to the receiver. A method for coupling between the transmitter and the receiver must therefore be implemented before the transmitter/receiver assembly can be used normally. If one and the same receiver is associated with a number of transmitters, for example to control a number of lamps, a coupling must be established between each transmitter and the receiver. The patent application US2004/061591 describes, for example, a method for coupling new transmitters to a receiver. In this document, a new transmitter is added by first activating a transmitter that is already known to the receiver and then, within a predetermined time window, by activating the transmitter to be added. The patent application GB2336045 also describes a coupling method implemented by employing a particular transmitter that makes it possible to configure the receiver to add new transmitters. These solutions from the prior art are not satisfactory because they require at least one of the transmitters to be already known to the receiver. Other methods involving entering a code for each transmitter or operating a number of buttons on the transmitter also exist. However, these are often not easy to implement. Furthermore, in the methods of the prior art, deleting a transmitter associated with the receiver is often very complicated.

The aim of the invention is to propose a method for coupling/uncoupling between a transmitter and a receiver communicating via a wireless link, that is reliable, safe, intuitive and simple to implement by an unqualified installer.

This aim is achieved by a method for coupling/uncoupling between a transmitter and a receiver capable of communicating with one another via a wireless link, the method comprising the following steps:

- transmission of a first signal by the transmitter,
- transmission of a second signal by said transmitter,
- amplitude processing by the receiver of the first signal and of the second signal received and storage or deletion by the receiver of an identification code of the transmitter according to the processing carried out.

According to the invention, the processing consists in comparing the amplitude of the first signal or the second signal received by the receiver with a first threshold value.

According to the invention, the processing also consists in comparing an amplitude variation between the first signal and the second signal received with a second threshold value.

According to the invention, the processing is, for example, carried out in a learning mode activated in the receiver. This learning mode is, for example, activated in the receiver for a predetermined time after the receiver is powered up.

According to the invention, the first signal is transmitted by the transmitter at a first distance from the receiver and the second signal is transmitted by the transmitter at a second distance from the receiver, the second distance being different from the first distance. In the event of a coupling between the transmitter and the receiver, the first distance is, for example, greater than the second distance and in the event of an uncoupling between the transmitter and the receiver, the first distance is, for example, less than the second distance.

According to the invention, the second signal is, for example, transmitted a number of times in succession to indicate to the receiver a rank to be given to the transmitter in the receiver. Thus, the newly stored transmitter can be associated with a particular output of the receiver if said receiver has a number of outputs.

According to a particular feature of the invention, the first signal and the second signal are transmitted using a button of the transmitter. The first signal can, for example, be transmitted when the button is pressed and the second signal can be transmitted when the button is released. The button is thus kept pressed when moving the transmitter from the first distance to the second distance. By keeping the button pressed when moving the transmitter, the receiver can perform a particular processing operation consisting in detecting the trend of the amplitude between the transmission of the first signal and the transmission of the second signal and, depending on whether there is a sufficient increase or decrease in amplitude, in storing or deleting the identification code of the transmitter in the receiver.

According to another particular feature, the method comprises a display step on the receiver that is used to indicate whether it is a coupling or an uncoupling between the transmitter and the receiver. The display step is, for example, performed using a light-emitting diode that is capable of blinking at a variable frequency to indicate the coupling or uncoupling between the transmitter and the receiver.

The invention also relates to a receiver that can be used in the method described hereinabove and capable of communicating by wireless link with a transmitter, said receiver comprising:

- storage means intended to store an identification code corresponding to the transmitter,
- processing means capable of performing an amplitude processing operation on a first signal sent by the transmitter and a second signal sent by the same transmitter and capable of storing in the storage means the identification code of the transmitter or deleting from its storage means the identification code corresponding to the transmitter depending on the processing carried out.

According to a particular feature, the processing means are capable of comparing the amplitude of the first signal or of the second signal received by the receiver with a first threshold value.

According to another particular feature, the processing means are capable of comparing an amplitude variation between the first signal and the second signal received with a second threshold value. In a variant, the processing means are capable of detecting the trend of the amplitude between the first signal and the second signal.

According to the invention, the receiver is provided with a learning mode in which a transmitter is stored or deleted. This learning mode is, for example, activated in the receiver for a predetermined time after the receiver is powered up.

According to the invention, the second signal is, for example, transmitted a number of times in succession to indicate to the receiver a rank to be given to the transmitter.

According to a particular feature, the receiver comprises, for example, a light-emitting diode capable of blinking at a variable frequency to indicate a storage or a deletion of the transmitter.

Figure 2A:
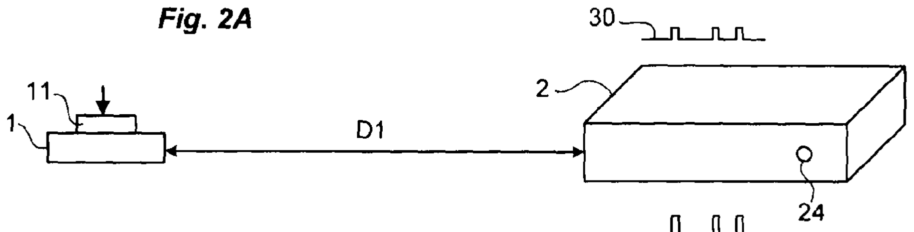
Figure 2B:
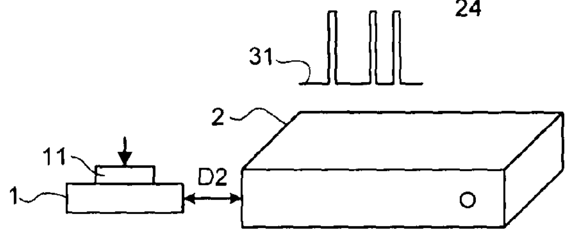
Figure 3A:
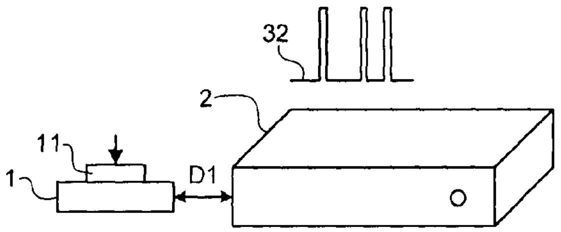
Figure 3B:
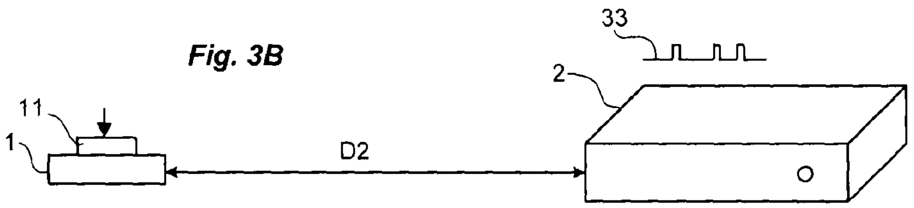
Figure 4A:
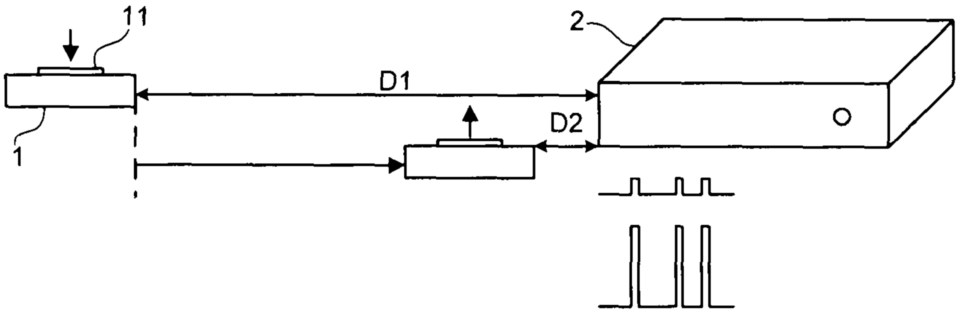
Figure 4B:
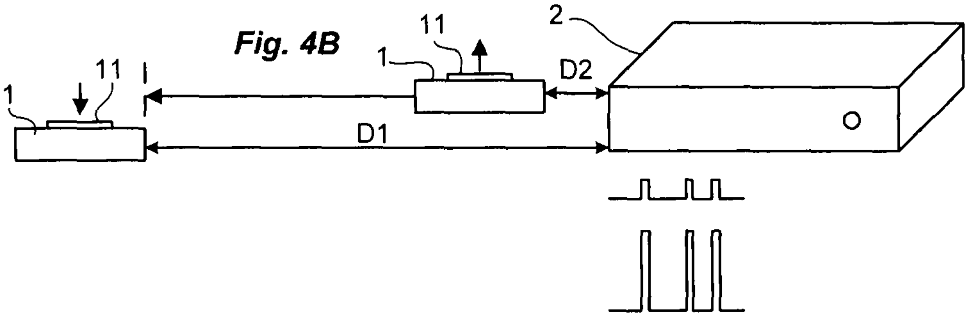

Other features and advantages will emerge from the following detailed description by referring to an embodiment given by way of example and represented by the appended drawings in which:

FIG. 1 represents a transmitter such as, for example, a push button capable of communicating by wireless link with a receiver controlling one or more outputs, FIGS. 2A and 2B illustrate the method for coupling between a transmitter and the receiver, FIGS. 3A and 3B illustrate the method for uncoupling between a transmitter and its receiver, FIGS. 4A and 4B illustrate variant embodiments of the coupling/uncoupling between the transmitter and the receiver.

FIG. 1 shows a number of transmitters 1 capable of communicating by wireless link with a receiver 2 that can control one or more outputs 20 (three outputs in FIG. 1). In FIGS. 1 to 4B, each transmitter 1 is, for example, a wireless push button capable of communicating with the receiver 2 via the wireless link.

The wireless push button can, in particular, be of the standalone type, that is to say without battery, operating using an energy converter of electromagnetic, piezoelectric, photovoltaic or other type. Obviously other types of transmitters can be considered such as, for example, position switch-type sensors. The wireless link can be of radio (including RFID), infrared, optical or other type. To simplify the description, reference is made hereinafter in the description to a push button-type transmitter 1 and to a radio link.

A transmitter 1 therefore comprises a button 11 which, when pressed, generates a radio signal 10 consisting of one or more identical frames of determined frequency unambiguously identifying the transmitter.

The receiver 2 comprises means of receiving signals originating from each transmitter, processing means 21, such as a microprocessor, for processing and interpreting each signal received and storage means 22 in which is stored a list 220 of the identification codes (C1, C2, Cn) of each transmitter 1 coupled to the receiver 2. The receiver 2 consists, for example, of a housing 23 containing an electronic card on which are mounted the processing means 21 and the storage means 22. The receiver 2 comprises, for example, on the front panel of its housing, display means, such as, for example, a light-emitting diode 24.

The receiver 2 is intended to control one or more outputs and may therefore be coupled to one or more transmitters 1 depending on the type and the number of outputs 20 that it controls. The outputs 20 may be, for example, one or more lamps, a garage door, etc. In order to be able to control each of its outputs 20 in an appropriate manner, the receiver 2 must then know all the transmitters 1 associated with each of its outputs. The receiver 2 must thus be placed in a learning mode in which it is capable of storing each new transmitter 1 in its list 220 or deleting a transmitter 1 from its list 220. The learning mode can, for example, be activated automatically for a predetermined time after each power-up of the receiver 2. As a variant, the learning mode can be activated deliberately by the user by switching the receiver 1 to this mode, for example by operating a button that can be accessed on the housing 23 of the receiver 2.

According to the invention, it is therefore necessary to implement a method for coupling between each new transmitter 1 and the receiver 2 in order for the latter to be able to store each new transmitter 1. According to the invention, with reference to FIGS. 2A and 2B, for the duration of the learning mode, the coupling between the receiver 2 and a new transmitter 1 is set up as follows:

- first activation of the new transmitter 1, by pressing and releasing the button 11, at a distance D1 from the receiver 2 (FIG. 2A),
- approach of the transmitter 1 relative to the receiver 2 and second activation of the same transmitter 1, by pressing and releasing its button 11, at a distance D2 from the receiver 2, the distance D2 being less than the distance D1 (FIG. 2B).

The two signals 30, 31 received by virtue of the reception means of the receiver 2 are processed by the processing means 21 of the receiver 2. Since both activations are done from the same transmitter 1, the receiver 2 receives two signals that are identical in terms of data. However, because of the variation of the activation distance of the transmitter relative to the receiver 2, the two signals 30, 31 received by the receiver 2 are different in amplitude as represented in FIGS. 2A and 2B.

The storage of the new transmitter 1 by the processing means 21 is validated by comparing the signals with at least two stored threshold values (S1, S2) defined as follows:

- the amplitude of the signal 31 when the transmitter 1 is at the distance D2 must be greater than a first threshold value S1,
- the difference between the distance D1 and the distance D2 must be sufficient for the amplitude variation between the signal 30 received from the distance D1 and the signal 31 received from the distance D2, for example defined by the ratio of the amplitude to the distance D1 and the amplitude to the distance D2, to be less than a second determined threshold value S2. Because of this, the distance D2 must be chosen to be very small for the signal received by the receiver from the distance D2 to have an amplitude that is much greater than that of the signal received when the transmitter is activated at the distance D1.

If both conditions are met, the receiver 2 must store in the list 220 of its storage means 22 an identification code (C1, C2, Cn) corresponding to the signal from the new transmitter 1 stored. Once storage is complete, the light-emitting diode 24 blinks, for example increasingly fast to give an impression of the approach of the transmitter 1.

According to the invention, if the receiver 2 has only a single output 20, the coupling is finished. On the other hand, if the receiver 2 has a number of outputs 20, as represented in FIG. 1, the transmitter 1 must be associated with a determined output. For this, after the second activation of the transmitter at the distance D2, it is sufficient to press the button 11 of the transmitter a number of times corresponding to the rank of the output with which the transmitter 1 must be associated. The rank assigned to the new transmitter is stored in the storage means 22 of the receiver and associated with the identification code of this transmitter in the list 220.

According to the invention, to delete a transmitter 1 from the storage means of the receiver 2 and therefore perform an uncoupling between the transmitter 1 and the receiver 2, the reverse procedure to that described hereinabove is carried out. The uncoupling is also performed when the receiver 2 is in the learning mode defined hereinabove, and therefore consists in:

- activating the transmitter 1 to be deleted a first time, by pressing and releasing the button 11, at a distance D1 from the receiver 2 (FIG. 3A),
- moving the same transmitter 1 away from the receiver 2 and activating it a second time, by pressing and releasing the button 11, at a distance D2 from the receiver 2, the distance D2 being greater than the distance D1 (FIG. 3B).

Compared to coupling, the uncoupling procedure therefore consists in moving the transmitter 1 away from the receiver 2. The processing of the two signals is similar to that described hereinabove. To confirm the deletion of a transmitter 1 from the list of the receiver 2, it is therefore necessary for:

the amplitude of the signal 32 received by the receiver 2 when the transmitter 1 is at the distance D1 to be greater than a first threshold value S3, the difference between the distance D1 and the distance D2 to be sufficient for the amplitude variation between the signal received from the distance D1 and the signal received from the distance D2, for example defined by the ratio between the amplitude of the signal transmitted from the distance D1 and the amplitude of the signal transmitted from the distance D2, to be greater than a determined second threshold value S4. Because of this, the distance D1 is chosen to be very small so that the signal received from this distance D1 has a much greater amplitude than that of the signal received when the transmitter 1 is activated at the distance D2.

If both conditions are met, the identification code of the transmitter 1 corresponding to the signals 32, 33 received by the receiver 2 is erased from the list 220 stored in the storage means 22. Once the erasure is complete, the light-emitting diode 24 blinks, for example increasingly slowly to give an impression that the transmitter 1 is moving away.

According to the invention, for the coupling or the uncoupling, it in fact involves using the principle whereby the power of a transmitted signal changes in free air like the inverse of the distance cubed. Consequently, between a signal received from the transmitter placed at a few centimeters and a signal received from this same transmitter at one meter, there is an amplitude ratio greater than a thousand. The amplitude variation is therefore easy to detect. The processing means 21 of the receiver 2 may thus include simple means of detecting the amplitude level of the received signals to compare them with the stored threshold values.

According to a variant embodiment represented in FIGS. 4A and 4B, it is possible to use a property of a wireless button that involves being able to send one or more frames when the button is pressed and also one or more frames when the button is released. Thus, in the event of a coupling or an uncoupling, the user presses the button 11 at the distance D1, which results in the transmission of one or more frames, and keeps the button pressed while moving to the distance D2 where the user releases the button 11 which again results in the transmission of the frames. The processing can then be carried out as described previously according to whether it is a coupling or an uncoupling or, in another configuration, may involve following the trend of the amplitude of the signal between the transmission of the first signal and the transmission of the second signal when the transmitter is moved relative to the receiver. In this other configuration, if the receiver detects a sufficient increase in the amplitude, it will store the transmitter or if it detects a sufficient decrease in the amplitude, it will proceed to delete the corresponding transmitter. The expressions sufficient increase or decrease should be understood to mean an increase or a decrease greater than a predetermined threshold value.

In another variant embodiment, it is possible to eliminate the learning mode to store or delete a transmitter 1. Simply detecting the crossing of the thresholds may be sufficient for the receiver 2 to detect that it has to store or delete a transmitter 1.

It is obvious that it is possible, without departing from the framework of the invention, to imagine other variants and refinements of detail and even envisage the use of equivalent means.

The invention claimed is:

1. A method for coupling/uncoupling between a transmitter and a receiver capable of communicating with one another via a wireless link, the method comprising:

transmitting by the transmitter a first signal comprising an identification code of the transmitter;

transmitting by the transmitter a second signal comprising the identification code of the transmitter;

comparing, by the receiver receiving the first signal and the second signal, an amplitude of the first signal with an amplitude of the second signal received; and storing or deleting, by the receiver, the identification code of the transmitter according to whether the comparison results in the amplitude of the first signal being less than or greater than the amplitude of the second signal.

2. The method according to claim 1, further comprising comparing the amplitude of the first signal or the amplitude of the second signal received by the receiver with a first threshold value.

3. The method according to claim 2, the comparing includes comparing an amplitude variation between the amplitude of the first signal and the amplitude of the second signal received with a second threshold value.

4. The method according to claim 3, wherein the first signal is transmitted by the transmitter at a first distance from the receiver and the second signal is transmitted by the transmitter at a second distance from the receiver, the second distance being different from the first distance.

5. The method according to claim 1, wherein the comparing is carried out in a learning mode activated in the receiver.

6. The method according to claim 5, wherein the learning mode is activated in the receiver for a predetermined time after the receiver is powered up.

7. The method according to claim 1, wherein the first signal is transmitted by the transmitter at a first distance from the receiver and the second signal is transmitted by the transmitter at a second distance from the receiver, the second distance being different from the first distance.

8. The method according to claim 7, wherein, in an event of a coupling, the first distance is greater than the second distance.

9. The method according to claim 7, wherein, in an event of an uncoupling, the first distance is less than the second distance.

10. The method according to claim 1, wherein the second signal is transmitted a number of times in succession to indicate to the receiver a rank to be given to the transmitter.

11. The method according to claim 1, wherein the first signal and the second signal are transmitted using a button of the transmitter.

12. The method according to claim 11, wherein the first signal is transmitted when the button is pressed and the second signal is transmitted when the button is released.

13. The method according to claim 12, further comprising:

following, in the receiver, a trend of an amplitude variation between the transmission of the first signal and the transmission of the second signal; and detecting a sufficient increase or decrease in the amplitude variation to store or delete the identification code of the transmitter.

14. The method according to claim 1, further comprising displaying on the receiver a coupling or an uncoupling, corresponding to said storing or deleting respectively, between the transmitter and the receiver.

15. The method according to claim 14, wherein the displaying is performed using a light-emitting diode that is capable of blinking at a variable frequency to indicate the coupling or uncoupling between the transmitter and the receiver.

16. A receiver capable of communicating by wireless link with a transmitter, comprising:

storage means configured to store an identification code corresponding to the transmitter; and processing means configured to:

perform a comparing operation of an amplitude of a first signal comprising the identification code of the transmitter sent by the transmitter with an amplitude of a second signal comprising the identification code of the transmitter sent by the same transmitter, and store in the storage means the identification code of the transmitter or delete from the storage means the identification code corresponding to the transmitter depending on the comparing operation results in the amplitude of the first signal being less than or greater than the amplitude of the second signal.

17. The receiver according to claim 16, wherein the comparing operation including comparing the amplitude of the first signal or of the amplitude of the second signal received by the receiver with a first threshold value.

18. The receiver according to claim 17, wherein the processing means further compares an amplitude variation between the amplitude of the first signal and the amplitude of the second signal received with a second threshold value.

19. The receiver according to claim 18, wherein the first signal is transmitted by the transmitter at a first distance from the receiver and the second signal is transmitted by the transmitter at a second distance from the receiver, the second distance being different from the first distance.

20. The receiver according to claim 16, wherein the processing means further detects a trend of an amplitude variation between the first signal and the second signal.

21. The receiver according to claim 16, wherein the receiver includes a learning mode in which a transmitter is stored or deleted.

22. The receiver according to claim 21, wherein the learning mode is activated in the receiver for a predetermined time after the receiver is powered up.

23. The receiver according to claim 16, wherein the second signal is transmitted a number of times in succession to indicate to the receiver a rank to be given to the transmitter.

24. The receiver according to claim 16, wherein the receiver comprises a light-emitting diode capable of blinking at a variable frequency to indicate a storage or a deletion of the transmitter.

* * * * *